(12) United States Patent
Husemann et al.

(10) Patent No.: US 8,333,865 B2
(45) Date of Patent: Dec. 18, 2012

(54) METHOD FOR MOUNTING PRINTING PLATES TO PRINTING CYLINDERS OR SLEEVES WITH ADHESIVE TAPE

(75) Inventors: Marc Husemann, Hamburg (DE); Torsten Runge, Hamburg (DE); Stephan Zollner, Hamburg (DE)

(73) Assignee: tesa SE, Hamburg (DE)

( * ) Notice: Subject to any disclaimer, the term of this patent is extended or adjusted under 35 U.S.C. 154(b) by 0 days.

(21) Appl. No.: 12/572,754

(22) Filed: Oct. 2, 2009

(65) Prior Publication Data

US 2010/0043969 A1 Feb. 25, 2010

Related U.S. Application Data

(62) Division of application No. 10/544,144, filed on Oct. 4, 2006, now abandoned.

(30) Foreign Application Priority Data

Jan. 29, 2003 (DE) ................................. 103 03 538
Apr. 1, 2003 (DE) ................................. 103 14 898

(51) Int. Cl.
*B32B 37/14* (2006.01)
*C09J 133/10* (2006.01)

(52) U.S. Cl. ..................... 156/299; 525/338.3; 525/291; 525/293; 522/113

(58) Field of Classification Search .................. 156/299; 525/330.3, 291, 293; 522/113
See application file for complete search history.

(56) References Cited

U.S. PATENT DOCUMENTS

| | | | |
|---|---|---|---|
| 3,983,287 A | 9/1976 | Goossen et al. | |
| 4,380,956 A | 4/1983 | Elworthy | |
| 4,554,324 A * | 11/1985 | Husman et al. | 525/301 |
| 4,574,697 A * | 3/1986 | Feeley | 101/401.1 |
| 4,574,712 A | 3/1986 | David | |
| 4,581,429 A | 4/1986 | Solomon et al. | |
| 5,476,712 A | 12/1995 | Hartman et al. | |
| 5,489,642 A | 2/1996 | Gleichenhagen et al. | |
| 5,599,602 A | 2/1997 | Leonard et al. | |
| 5,608,023 A | 3/1997 | Odell et al. | |
| 5,613,942 A | 3/1997 | Lucast et al. | |
| 5,708,109 A * | 1/1998 | Bennett et al. | 526/307.7 |
| 5,767,210 A | 6/1998 | Lecomte et al. | |

(Continued)

FOREIGN PATENT DOCUMENTS

DE 692 14 164 7/1993

(Continued)

OTHER PUBLICATIONS

Polymer Properties from Aldrich, Table I: Thermal Transitions of Homopolymers: Glass Transition and Melting Point Temperatures.*

(Continued)

*Primary Examiner* — Katarzyna Wyrozebski Lee
*Assistant Examiner* — Daniel Lee
(74) *Attorney, Agent, or Firm* — Norris McLaughlin & Marcus PA

(57) ABSTRACT

Pressure-sensitive adhesive tape made of a flat, support material each side of which is coated with a pressure-sensitive adhesive, the pressure-sensitive adhesive on at least one side being produced from a monomer mixture comprising a monomer of the formula $CH_2=CH(R_1)(COOR_2)$, where $R_1=H$ or $CH_3$ and $R_2$ is an alkyl radical having 1 to 10 carbon atoms or H and the homopolymer possesses a static glass transition temperature of $<-30°$ C.

11 Claims, 1 Drawing Sheet

U.S. PATENT DOCUMENTS

| | | | |
|---|---|---|---|
| 5,789,487 A | 8/1998 | Matyjaszewski et al. | |
| 5,811,500 A | 9/1998 | Dubois et al. | |
| 5,854,364 A | 12/1998 | Senninger et al. | |
| 5,919,871 A | 7/1999 | Nicol et al. | |
| 5,945,491 A | 8/1999 | Matyjaszewski et al. | |
| 6,114,482 A | 9/2000 | Senninger et al. | |
| 6,281,311 B1 | 8/2001 | Lai et al. | |
| 6,293,037 B1 | 9/2001 | Spada et al. | |
| 6,479,608 B1 | 11/2002 | Nesvadba et al. | |
| 6,642,318 B1 | 11/2003 | Chiefari et al. | |
| 6,666,752 B1 * | 12/2003 | Yamamoto et al. | 451/41 |
| 6,706,463 B2 * | 3/2004 | Inno et al. | 430/302 |
| 6,765,078 B2 | 7/2004 | Husemann et al. | |
| 2003/0012945 A1 | 1/2003 | Runge et al. | |
| 2003/0113533 A1 | 6/2003 | Husemann et al. | |
| 2003/0190467 A1 | 10/2003 | Husemann et al. | |
| 2004/0171777 A1 | 9/2004 | Le et al. | |
| 2005/0064181 A1 | 3/2005 | Blank et al. | |

FOREIGN PATENT DOCUMENTS

| | | |
|---|---|---|
| DE | 43 40 297 | 6/1995 |
| DE | 199 49 352 | 4/2000 |
| DE | 100 30 217 | 1/2002 |
| DE | 100 36 804 | 2/2002 |
| DE | 101 29 730 | 1/2003 |
| DE | 101 53 677 | 5/2003 |
| EP | 0 206 760 | 12/1986 |
| EP | 0 655 490 | 5/1995 |
| EP | 0 826 698 | 3/1996 |
| EP | 0 824 110 | 8/1996 |
| EP | 0 735 052 | 10/1996 |
| EP | 0 824 111 | 2/1998 |
| EP | 0 841 346 | 6/1998 |
| EP | 0 850 957 | 7/1998 |
| EP | 1 188 802 | 3/2002 |
| EP | 1 302 521 | 4/2003 |
| GB | 1 533 431 | 11/1978 |
| WO | 96/24620 | 8/1996 |
| WO | 98/01478 | 1/1998 |
| WO | 98/13392 | 4/1998 |
| WO | 98/44008 | 10/1998 |
| WO | 99/31144 | 6/1999 |
| WO | 03/057497 | 7/2003 |
| WO | 2004/050784 | 6/2004 |

OTHER PUBLICATIONS

Petrie, Handbook of Adhesives and Sealants, pp. 82-84.*
Journal of Polymer Science, Polymer Chemistry Edition 14 (1976) 1495-1511.
T.G. Fox, Bull. Am. Phys. Soc. 1 (1956) 123.
Houben Weyl, Methoden der Organischen Chemie, vol. E 19a, pp. 60-147.
Fouassier: "Photoinitiation, Photopolymerization and Photocuring: Fundamentals and Applications", Hanser-Verlag, Munich 1995.
Carroy et al. In "Chemistry and Technology of UV and EB Formulation for Coatings, Inks and Paints", Oldring (ed.), 1994, SITA, London.
Skelhorne, Electron Beam Processing, in Chemistry and Technology of UV and EB Formulation for Coatings, Inks and Paints, vol. 1, 1991, SITA, London.
Petrie, Handbook of Adhesives and Sealants, McGraw-Hill (2000), pp. 82-84.
htpp://www.sigmaaldrich.com/etc/medialib/docs/Aldrich/General_information/thermal_transitions_of_homopolymers. Par.0001. File.tmp/thermal_transitions_of_homopolymers.pdf (date unavailable).

* cited by examiner

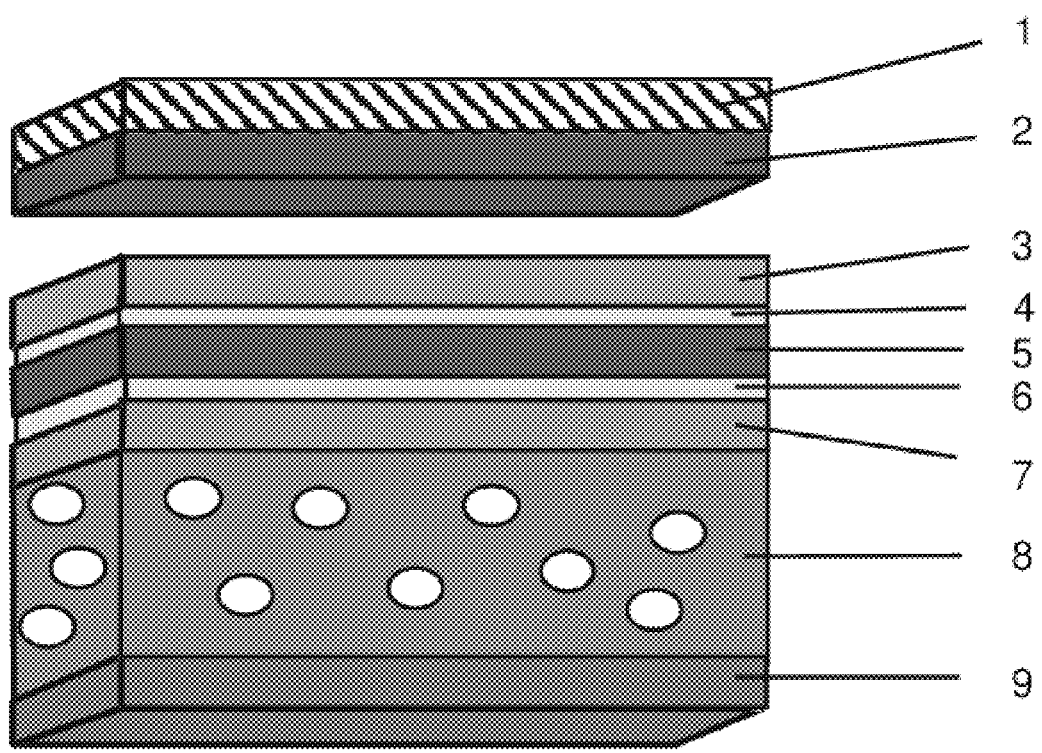

METHOD FOR MOUNTING PRINTING PLATES TO PRINTING CYLINDERS OR SLEEVES WITH ADHESIVE TAPE

This is a Division of application Ser. No. 10/544,144, now abandoned.

BACKGROUND OF THE INVENTION

The invention relates to pressure-sensitive adhesive (PSA) tapes and to a method of producing pressure-sensitive adhesives (PSAs) for the adhesive bonding of printing plates, the PSA possessing a very low peel increase on polar surfaces and being easy to reposition, and, after the bonding on the printing cylinder, exhibiting low edge lifting of the printing plate and of the assembly formed from adhesive plate-mounting tape and printing plate.

The printing industry knows of a variety of techniques for transferring designs to paper, for example, by means of print originals. One possibility is that known as flexographic printing. One embodiment of flexographic printing, in turn, is the use of multilayer photopolymer printing plates with a flexible substructure, this type of printing having been part of the prior art for a relatively long time. The printing plates in this case are composed of a plurality of layers of different polymeric materials each with specific functions. For example, the "nyloflex MA" and "nyloflex ME" printing plates from BASF AG have three layers, namely a light-sensitive relief layer, a stabilizing film below it, and an elastic carrier layer.

In the flexographic printing process, flexible printing plates are bonded adhesively to printing cylinders. This bonding is generally carried out using double-sided PSA tapes, on which very stringent requirements are imposed. For the printing process, the PSA tape is required to have a certain hardness but also a certain elasticity. These properties must be set very precisely in order that the printed image produced yields the desired result in accordance with the requirements. Further stringent requirements are imposed on the PSA itself, where the bond strength must likewise be high so that the printing plate does not detach from the double-sided PSA tape or the PSA tape from the cylinder. This must be so even at increased temperatures of_40-60° C. and at high printing speeds. In addition to this property, however, the adhesion properties of the PSA must also be reversible, since it is often necessary to bond the printing plates and then to detach them again for repositioning. This detachability should also exist in the case of an adhesive bond over a prolonged time period (up to six months). Moreover, it is desired that the PSA tape and especially the printing plate can be removed again without destruction thereof, i.e., without great application of force. In addition, no residues should remain on the printing plate or on the cylinder. In summary, then, very stringent requirements are imposed on the double-sided PSA tapes that are suitable for this utility.

U.S. Pat. No. 4,380,956 describes a process for mounting a printing plate for the flexographic printing process. PSAs are among the adhesives used for this process, but have not been specified in any greater detail.

GB 1,533,431 claims a double-sided PSA tape including an elastomeric layer which in turn is foamed by fragile air bubbles. The air bubbles are destroyed under pressure during the flexographic printing application.

U.S. Pat. No. 4,574,697 claims double-sided PSA tapes comprising as their carrier material a flexible polyurethane foam affixed to a PET (polyethylene terephthalate) film. The outer layers are composed of pressure-sensitive adhesives. The PSA tape described is to be reversible and to be removable from the printing cylinder and from the printing plate. A similar product structure has been described in EP 0 206 760. There, the flexible foam carrier used was a polyethylene foam.

U.S. Pat. No. 4,574,712, in analogy to U.S. Pat. No. 4,574,697, describes a similar PSA tape construction. Here there is a restriction on the PSAs, namely that the bond strength to the printing plate and to the printing cylinder should be lower than to the carrier film and the carrier foam.

U.S. Pat. No. 3,983,287 describes a laminate whose carrier material comprises an incompressible elastomer. Compressibility is achieved by means of beads which are destroyed under pressure and which therefore produce flexibility.

U.S. Pat. No. 5,613,942 describes PSA tapes which are especially suitable for bonds on wet surfaces. It is mentioned, inter alia, that such tapes are suitable for bonding printing plates.

U.S. Pat. No. 5,476,712 likewise describes a double-sided PSA tape which is used in the flexographic printing process. This PSA tape contains, in turn, a thermoplastic elastomer, the structure present in this case being a cellular structure produced by means of expanding microparticles.

In the cases mentioned above, a very large number of different PSAs are used. Natural rubber adhesives possess good tack properties but lack great shear strength at room temperature, and age as a result of degradation via the double bonds present in the polymer.

SIS-based or SEBS-based PSAs are generally very soft and tacky and tend to soften at high temperatures as well. If the printing plate is bonded to the printing cylinder under tension using an SIS or SEBS PSA, the printing plate tends to detach, despite the fact that the bond strength is high.

Acrylate PSAs, on the other hand, are very suitable for bonding printing plates to printing cylinders but have to be crosslinked in the preparation process following the coating operation. Moreover, these PSAs, owing to the multiplicity of ester groups and the resulting polarity, have a tendency toward high peel increase.

As a result the printing plates can be removed only with very high application of force. Moreover, the PSA must exhibit a certain hardness, so that, after bonding to the printing cylinder, the printing plates do not tend toward edge lifting over a prolonged time period.

There is therefore a need for a pressure-sensitive acrylate adhesive which is suitable for bonding printing plates and which meets the abovementioned requirements.

SUMMARY OF THE INVENTION

The invention accordingly provides a double-sided pressure-sensitive adhesive tape for mounting printing plates, especially multilayer photopolymer printing plates, on printing cylinders or sleeves, the carrier of the pressure-sensitive adhesive tape being a film, foam or composite of the two and there being double-sidedly self-adhesive coatings applied to the corresponding carrier or composite, with both, but at least the side facing the printing plate, having been provided with a pressure-sensitive adhesive system of the invention/inventive pressure-sensitive adhesive system.

DETAILED DESCRIPTION

The pressure-sensitive adhesive tape of the invention with a flat carrier material, is coated on both sides with a pressure-sensitive adhesive, and consists in that at least one side of the carrier material is coated with a polymer-based pressure-sensitive adhesive which is preparable from a monomer mixture comprising at least the following components:

i.a) 49.5%-89.5% by weight (based on the monomer mixture) of acrylic esters and/or methacrylic esters and/or the corresponding free acids with the following formula:

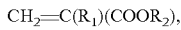
$CH_2=C(R_1)(COOR_2)$, where $R_1$=H or $CH_3$ and $R_2$ is an alkyl radical having 1 to 10 carbon atoms or H and the homopolymer possesses a static glass transition temperature of <−30° C.;

i.b) 10% to 40% by weight (based on the monomer mixture) of acrylic esters and/or methacrylic esters with the following formula:

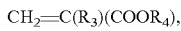
$CH_2=C(R_3)(COOR_4)$, where $R_3$=H or $CH_3$ and $R_4$ is a cyclic alkyl radical having at least 8 carbon atoms or a linear alkyl radical having at least 12 carbon atoms and the homopolymer possesses a static glass transition temperature of at least 30° C.;

i.c) 0.5%-10% by weight (based on the monomer mixture) of acrylic esters and/or methacrylic esters with the following formula:

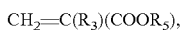
$CH_2=C(R_3)(COOR_5)$, where $R_3$=H or $CH_3$ and $R_5$=H or an aliphatic radical containing a functional group X, X comprising COOH, OH, —NH, $NH_2$, SH, $SO_3H$, and the homopolymer possesses a static glass transition temperature of at least 30° C.

The invention relates correspondingly to a two-stage method of producing pressure-sensitive adhesives based on a polymer with the following monomer mixture comprising at least the following components (i.a) 49.5% to 89.5% by weight (based on the monomer mixture) of acrylic esters and/or methacrylic esters and/or the corresponding free acids with the following formula:

$CH_2=C(R_1)(COOR_2)$, where $R_1$=H or $CH_3$ and $R_2$ is an alkyl radical having 1 to 10 carbon atoms or H and the homopolymer possesses a static glass transition temperature of <−30° C.;

(i.b) 10% to 40% by weight (based on the monomer mixture) of acrylic esters and/or methacrylic esters with the following formula:

$CH_2=C(R_3)(COOR_4)$, where $R_3$=H or $CH_3$ and $R_4$ is a cyclic alkyl radical having at least 8 carbon atoms or a linear alkyl radical having at least 12 carbon atoms and the homopolymer possesses a static glass transition temperature of at least 30° C.;

(i.c) 0.5% to 10% by weight (based on the monomer mixture) of acrylic esters and/or methacrylic esters with the following formula:

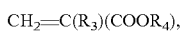
$CH_2=C(R_3)(COOR_5)$, where $R_3$=H or $CH_3$ and $R_5$=H or an aliphatic radical containing a functional group X, X comprising COOH, OH, —NH, $NH_2$, SH, $SO_3H$, and the homopolymer possesses a static glass transition temperature of at least 30° C., and in a polymerization process
at least two thermally decomposing initiators having a grafting activity of ε<5 and of ε>10, polymerization first taking place linearly with ε<5 and then, with ε>10, graft polymers being prepared
and the crosslinking of the polymers prepared by the above-mentioned process, with a fraction of 0.2%-1.0% by weight of crosslinker These pressure-sensitive adhesive systems are distinguished by the fact that the abovementioned prerequisites are met and exhibit in particular the following advantages:
multiple reusability (repositionability) of the PSA tapes
reversibility on different surfaces
low peel increase even on polar surfaces
minimized edge lifting after bonding on the printing cylinder Glass transition temperatures are reported as results of quasi-static techniques such as, for example, differential scanning calorimetry (DSC).

In order to obtain the polymer glass transition temperature, $T_G$, in accordance with the comments made above and below, the monomers are very preferably selected in such a way, and the quantitative composition of the monomer mixture advantageously chosen in such a way, that the polymer has the desired $T_G$ in accordance with equation (E1) (in analogy to the Fox equation; cf. T. G. Fox, Bull. Am. Phys. Soc. 1 (1956) 123).

$$\frac{1}{T_G} = \sum_n \frac{w_n}{T_{G,n}} \tag{E1}$$

In this equation, n represents the serial number of the monomers used, $w_n$ represents the mass fraction of the respective monomer n (% by weight), and $T_{G,n}$ represents the respective glass transition temperature of the homopolymer of each of the monomers n, in K.

(Meth)acrylic monomers which can be used with great preference as a component in the sense of (i.a) encompass acrylic and methacrylic esters having alkyl groups consisting of 1 to 10 carbon atoms. Specific examples of such compounds, without wishing to be restricted by this enumeration, are n-butyl acrylate, n-pentyl acrylate, n-hexyl acrylate, n-heptyl acrylate, n-octyl acrylate, n-nonyl acrylate, 2-ethylhexyl acrylate and isooctyl acrylate.

(Meth)acrylic monomers which can be used with great preference as a component in the sense of (i.b) encompass acrylic and methacrylic esters with a cyclic alkyl radical having at least 8 carbon atoms or a linear alkyl radical having at least 12 carbon atoms. Specific examples are, e.g., n-lauryl acrylate, stearyl acrylate, isobornyl acrylate, isobornyl methacrylate and norbornyl acrylate, this enumeration possessing no claim to completeness.

(Meth)acrylic monomers which can be used with great preference as a component in the sense of (i.c) encompass the free acids and also aliphatic radicals containing a functional group X, X being COON, OH, —NH, $NH_2$, SH or $SO_3H$. Specific examples of such compounds, without wishing to be restricted by this enumeration, are hydroxyethyl acrylate, hydroxypropyl acrylate, hydroxyethyl methacrylate, hydroxypropyl methacrylate, n-methylolacrylamide, acrylic acid, methacrylic acid, allyl alcohol, maleic anhydride, itaconic anhydride and itaconic acid.

In a further favorable embodiment the monomers (i.c) are functionalized such that a thermally initiated crosslinking can be carried out. Crosslinkers which can be chosen favorably include the following: epoxides, aziridines, isocyanates, polycarbodiimides and metal chelates, to name but a few.

One preferred characteristic of the copolymers used for the pressure-sensitive adhesive systems of the invention is that their molar mass $M_n$ is between about 10 000 and about 600 000 g/mol, preferably between 30 000 and 400 000 g/mol, more preferably between 50 000 g/mol and 300 000 g/mol.

A further preferred characteristic is that the polymer chains are present in a branched state as graft polymers.

To prepare the copolymers of the invention it is possible in principle to use any free-radical or radical-controlled polymerizations, including combinations of different polymerization methods. Besides conventional free radical polymerization mention may be made, for example, without possessing any claim to completeness, of ATRP, nitroxide/TEMPO-controlled polymerization or the RAFT process, in other words, in particular, those methods which allow control of the chain lengths or the polymer architecture.

As free-radical initiators for the free-radical polymerization it is possible to use any customary initiators known for this purpose for acrylates. The preparation of C-centered radicals is described in Houben Weyl, Methoden der Organischen Chemie, Vol. E 19a, pp. 60-147. These methods may be employed analogously. Examples of radical sources are peroxides, hydroperoxides, and azo compounds; as nonexclusive examples of typical free-radical initiators mention may be made here of potassium peroxodisulfate, dibenzoyl peroxide, cumene hydroperoxide, cyclohexanone peroxide, di-t-butyl peroxide, azodiisobutyronitrile, cyclohexylsulfonyl acetyl peroxide, diisopropyl percarbonate, t-butyl peroctoate, and benzpinacol. In one very preferred variant, the initiators are added in a number of stages, so that the conversion is increased to more than 90%. The residual monomer content of the polymer can in this way be decreased to below 10% by weight; by virtue of a low residual monomer content, the adhesive properties of the polyacrylate are considerably improved in respect of the bonding of printing cylinders.

The initiators added at the beginning are preferably chosen for their low propensity to form side chains in the polymers; their grafting activity is preferably below a level of $\epsilon < 5$ at the temperature of the reaction mixture when the initiator is added.

The absolute grafting activity (crosslink efficiency) is defined as the number of chemical side chains formed per 100 mole units of decomposed initiator. In analogy to van Drumpt and Oosterwijk [Journal of Polymer Science, Polymer Chemistry Edition 14 (1976) 1495-1511], it is possible to specify a value for this number by determining the dimers in a defined solution of the initiator; see also DE 43 40 297 A1:

A precisely 0.1 molar solution of the initiator is decomposed in n-pentadecane under an He atmosphere. The reaction time is chosen to correspond to ten times the half-life of the respective initiator at the chosen temperature. This ensures virtually complete decomposition of the initiator. Subsequently, the fraction of dimeric pentadecane produced is measured by means of GLC. The percentage fraction $\epsilon$ is stated as a measure of the grafting activity. The reaction temperature is normally chosen so that the half-life of the test initiator at this temperature is 15 minutes.

High $\epsilon$ values for the grafting activity imply a high propensity of the initiator to form side chains in the polymerization, whereas small $\epsilon$ values result in preferentially linear polymers.

In one preferred procedure, the process sequence is as follows:
the reaction solution used is an at least 50% strength solution of the monomers with added initiator with an $\epsilon$ value of $<5$,
the free-radical polymerization is conducted within a temperature range from 50° C. to 90° C.,
during the polymerization the batch is reinitiated at least once using a free-radical polymerization initiator with a low propensity to form side chains (grafting activity $\epsilon < 5$ at the prevailing reaction temperature),
if desired, the reaction is controlled by diluting the reaction solution according to the viscosity of the polymer,
controlled reinitiation is carried out with up to 2% by weight, based on the monomer mixture, of an initiator with an increased propensity to form side chains (grafting activity $\epsilon > 10$ at the prevailing reaction temperature), the polymerization is conducted to a conversion $>90\%$, preferably $>95\%$.

Preferred initiators having a low $\epsilon$ value ($\epsilon < 5$) are those whose radicals, owing to their low energy content, cause infrequent, if any, abstraction of hydrogen from the polymer chains. It is preferred here to use, for example, azo initiators such as azoisobutyrodinitrile or derivatives thereof, such as 2,2-azobis(2-methylbutyronitrile) (Vazo67, DuPont).

Initiators having a high side-chain formation propensity (high $\epsilon$ value $>10$) give high grafting yields even at relatively low temperatures. Particular preference is given here to using bis(4-t-butylcyclohexyl)peroxydicarbonate (Perkadox 16, Akzo Chemie), dibenzoyl peroxide or the like.

The polymerization may be conducted in the presence of an organic solvent or in the presence of water or in mixtures of organic solvents and/or water. As solvents for the polymerization it is possible to use all solvents which are suitable or commonly used for free-radical polymerizations, with acetone, ethyl acetate, petroleum spirit, toluene or any mixtures of these solvents being particularly appropriate.

It is preferred to use as little solvent as possible. Depending on conversion, temperature, and initiation, the polymerization time is between 6 and 48 h.

For radical stabilization an advantageous procedure is to use nitroxides of type (NIT 1) or (NIT 2):

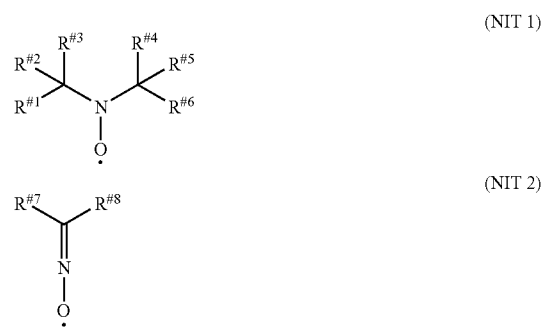

where $R^{\#1}$, $R^{\#2}$, $R^{\#3}$, $R^{\#4}$, $R^{\#5}$, $R^{\#6}$, $R^{\#7}$ and $R^{\#8}$ independently of one another denote the following compounds or atoms:
i) halides, such as chlorine, bromine or iodine, for example;
ii) linear, branched, cyclic and heterocyclic hydrocarbons having 1 to 20 carbon atoms, which may be saturated, unsaturated or aromatic;
iii) esters —COOR$^{\#9}$, alkoxides —OR$^{\#10}$ and/or phosphonates —PO(OR$^{\#11}$)$_2$, where R$^{\#9}$, R$^{\#10}$ and/or R$^{\#11}$ stand for radicals from group ii).

Compounds of structure (NIT 1) or (NIT 2) can also be attached to polymer chains of any kind (primarily such that at least one of the abovementioned radicals constitutes such a polymer chain).

More preferred are controlled regulators for the polymerization of compounds of the following type:
2,2,5,5-tetramethyl-1-pyrrolidinyloxyl (PROXYL), 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3,4-di-t-butyl-PROXYL 2,2,6,6-tetramethyl-1-piperidinyloxyl (TEMPO), 4-benzoyloxy-TEMPO, 4-methoxy-TEMPO, 4-chloro-TEMPO, 4-hydroxy-TEMPO, 4-oxo-TEMPO, 4-amino-TEMPO, 2,2,6,6-tetraethyl-1-piperidinyloxyl, 2,2,6-trimethyl-6-ethyl-1-piperidinyloxyl N-tert-butyl 1-phenyl-2-methylpropyl nitroxide N-tert-butyl 1-(2-naphthyl)-2-methylpropyl nitroxide N-tert-butyl 1-diethylphosphono-2,2-dimethylpropyl nitroxide N-tert-butyl 1-dibenzylphosphono-2,2-dimethylpropyl nitroxide N-(1-phenyl-2-methylpropyl) 1-diethylphosphono-1-methylethyl nitroxide di-t-butyl nitroxide diphenyl nitroxide t-butyl t-amyl nitroxide.

U.S. Pat. No. 4,581,429 A discloses a controlled-growth free-radical polymerization process initiated using a compound of the formula R'R"N—O—Y in which Y is a free radical species which is able to polymerize unsaturated monomers. The reactions, however, generally have low conversions. A particular problem is the polymerization of acrylates, which proceeds only to very low yields and molar masses. WO 98/13392 A1 describes open-chain alkoxyamine compounds which have a symmetrical substitution pattern. EP 735 052 A1 discloses a process for preparing thermoplastic elastomers having narrow molar mass distributions. WO 96/24620 A1 describes a polymerization process using very specific radical compounds such as, for example, phosphorus-containing nitroxides which are based on imidazolidine. WO 98/44008 A1 discloses specific nitroxyls based on morpholines, piperazinones and piperazinediones. DE 199 49 352 A1 describes heterocyclic alkoxyamines as regulators in controlled-growth free-radical polymerizations. Corresponding further developments of the alkoxyamines or of the corresponding free nitroxides enhance the efficiency for preparing polyacrylates (Hawker, paper to the National Meeting of the American Chemical Society, Spring 1997; Husemann, paper to the IUPAC World-Polymer Meeting 1998, Gold Coast).

As a further controlled polymerization method it is possible advantageously to use atom transfer radical polymerization (ATRP), with preferably monofunctional or difunctional secondary or tertiary halides being used as initiators and, to abstract the halide(s), complexes of Cu, Ni, Fe, Pd, Pt, Ru, Os, Rh, Co, Ir, Ag or Au (EP 0 824 111 A1; EP 826 698 A1; EP 824 110 A1; EP 841 346 A1; EP 850 957 A1). The different possibilities of ATRP are further described in U.S. Pat. No. 5,945,491 A, U.S. Pat. No. 5,854,364 A and U.S. Pat. No. 5,789,487 A.

A very preferred preparation process conducted is a version of RAFT polymerization (reversible addition-fragmentation chain transfer polymerization). The polymerization process is described in detail in, for example, WO 98/01478 A1 and WO 99/31144 A1. In one very advantageous version, for example, the trithiocarbonates (TTC1) and (TTC2) or the thio compounds (THI1) and (THI2) are used for the polymerization, in which Φ can be a phenyl ring, which can be unfunctionalized or functionalized by alkyl or aryl substituents attached directly or via ester or ether bridges, or can be a cyano group, or can be a saturated or unsaturated aliphatic radical.

Examples of possible functionalizations for the phenyl ring Φ include halogens, hydroxyl groups, epoxide groups, and groups containing nitrogen or containing sulfur, without this list making any claim to completeness.

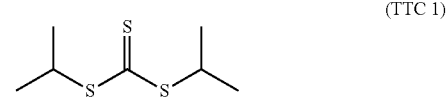
(TTC 1)

(TTC 2)

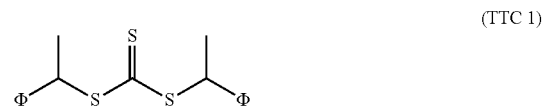
(TTC 1)

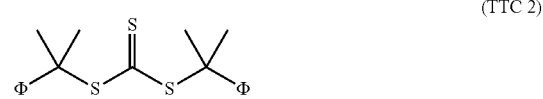
(TTC 2)

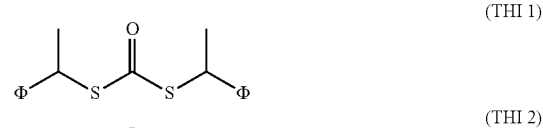
(THI 1)

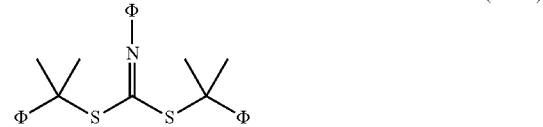
(THI 2)

It is additionally possible to employ thioesters of the general structure $$R^{S1}-C(S)-S-R^{S2} \quad (THE),$$

particularly in order to prepare asymmetric systems. $R^{S1}$ and $R^{S2}$ may be selected independently of one another and $R^{S1}$ can be a radical from one of groups i) to iv) below, and $R^{S2}$ a radical from one of groups i) to iii) below:

i) $C_1$ to $C_{18}$ alkyl, $C_2$ to $C_{18}$ alkenyl, $C_2$ to $C_{18}$ alkynyl, each linear or branched; aryl, phenyl, benzyl, aliphatic and aromatic heterocycles.

ii) $-NH_2$, $-NH-R^{S3}$, $-NR^{S3}R^{S4}$, $-NH-C(O)-R^{S3}$, $-NR^{S3}-C(O)-R^{S4}$, $-NH-C(S)-R^{S3}$, $-NR^{S3}-C(S)-R^{S4}$,

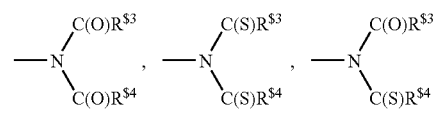

where $R^{S3}$ and $R^{S4}$ are radicals selected independently of one another from group i).

iii) $-S-R^{S5}$, $-S-C(S)-R^{S5}$, where $R^{S5}$ can be a radical from one of groups i) and ii).

iv) $-O-R^{S6}$, $-O-C(O)-R^{S6}$, where $R^{S6}$ can be a radical selected from one of groups i) and ii).

The inventive PSAs prepared by the methods described above can be coated from solution or from the melt. In one embodiment of the invention, the solvent is stripped off preferably in a concentrating extruder under reduced pressure, it being possible to use, for example, single-screw or twinscrew extruders for this purpose, which preferentially distill off the solvent in different or the same vacuum stages and which possess a feed preheater.

For advantageous further development in accordance with the invention, tackifier resins may be admixed to the PSAs. In principle, it is possible to use all resins soluble in the corresponding polymer. Suitable tackifier resins include rosin and rosin derivatives (rosin esters, including rosin derivatives stabilized by, for example, disproportionation or hydrogenation) polyterpene resins, terpene-phenolic resins, alkylphenol resins, and aliphatic, aromatic and aliphatic-aromatic hydrocarbon resins, to name but a few. Primarily, the resins chosen are those which are compatible preferentially with the polymer. The weight fraction of the resins is typically up to 40% by weight, more preferably up to 30% by weight.

It is also possible, optionally, to add plasticizers, fillers (e.g., fibers, carbon black, zinc oxide, titanium dioxide, chalk, solid or hollow glass beads, microbeads of other materials, silica, silicates), nucleators, expandants, compounding agents and/or aging inhibitors, in the form of primary and secondary antioxidants or in the form of light stabilizers, for example.

A further constituent of the inventive method is the increase in the internal strength (cohesion) of the pressure-sensitive adhesive through the crosslinking with a crosslinker. For this purpose, compatible crosslinker substances are added to the acrylate PSAs. Examples of suitable crosslinkers include metal chelates, such as Z. aluminum or titanium chelates, polyfunctional isocyanates, polyfunctional amines, polyfunctional alcohols or polyfunctional epoxides.

For the properties of the PSA it is of great advantage if the weight-percentage fraction of the crosslinker relative to the polymer is between 0.2% and 1%, with particular preference between 0.3% and 0.8%.

For a further inventive version, crosslinking is carried out with actinic radiation. For this purpose it is advantageous to add polyfunctional acrylates or methacrylates as crosslinkers.

For the optional crosslinking with UV light, UV-absorbing photoinitiators are added to the acrylate PSAs employed in the systems of the invention. Useful photoinitiators which can be used to great effect are benzoin ethers, such as benzoin methyl ether and benzoin isopropyl ether, for example, substituted acetophenones, such as 2,2-diethoxyacetophenone (available as Irgacure 651® from Ciba Geigy®), 2,2-dimethoxy-2-phenyl-1-phenylethanone, dimethoxyhydroxy-acetophenone, substituted α-ketols, such as 2-methoxy-2-hydroxypropiophenone, aromatic sulfonyl chlorides, such as 2-naphthylsulfonyl chloride, and photoactive oximes, such as 1-phenyl-1,2-propanedione 2-(O-ethoxycarbonyl)oxime.

The abovementioned photoinitiators and others which can be used, including those of the Norrish I or Norrish II type, can contain the following radicals: benzophenone, acetophenone, benzil, benzoin, hydroxyalkylphenone, phenyl cyclohexyl ketone, anthraquinone, trimethylbenzoylphosphine oxide, methylthiophenyl morpholinyl ketone, aminoketone, azobenzoin, thioxanthone, hexarylbisimidazole, triazine or fluorenone, it being possible for each of these radicals to be further substituted by one or more halogen atoms and/or one or more alkyloxy groups and/or one or more amino groups or hydroxyl groups. A representative overview is given by Fouassier: "Photoinitiation, Photopolymerization and Photocuring: Fundamentals and Applications", Hanser-Verlag, Munich 1995. For further details it is possible to consult Carroy et al. in "Chemistry and Technology of UV and EB Formulation for Coatings, Inks and Paints", Oldring (ed.), 1994, SITA, London.

In principle it is also possible to crosslink the PSAs using electron beams alone or additionally. Typical irradiation devices which may be employed are linear cathode systems, scanner systems, and segmented cathode systems, in the case of electron beam accelerators. A detailed description of the state of the art, and the most important process parameters, are found in Skelhorne, Electron Beam Processing, in Chemistry and Technology of UV and EB Formulation for Coatings, Inks and Paints, Vol. 1, 1991, SITA, London. The typical acceleration voltages are situated within the range between 50 kV and 500 kV, preferably 80 kV and 300 kV. The scatter doses used range between 5 to 150 kGy, in particular between 20 and 100 kGy.

A further part of the invention is the side of the PSA that faces the printing cylinder. Here it is possible to use all of the PSAs that are known to the skilled worker. Suitable accordingly are rubber-based PSAs, synthetic rubber PSAs, PSAs based on polysilicones, polyurethanes, polyolefins or polyacrylates, without this enumeration having any claim to completeness.

In one preferred version of the invention use is made of PSA systems based on the PSA facing the printing plate. The PSA systems may possess the same composition or a different composition. The composition corresponds to the PSA that has already been described and is facing the printing plate.

In one further, very preferred version, an acrylate PSA is used for bonding on the printing cylinder or sleeve, particularly polyurethane sleeves.

Suitable carrier materials for the PSA tapes include the films which are customary and familiar to the skilled worker, such as polyesters, PET, PE, PP, BOPP, PVC, etc., for example. This list is not conclusive. A film of polyethylene terephthalate is used in one particularly preferred version.

Also suitable as carrier materials for the double-sided PSA tapes of the invention, however, are foam carriers. In preferred versions, polymer foams are used, in which case the carrier foams are composed, for example, of polyolefins—especially polyethylene or polypropylene—or of polyurethanes or of polyvinyl chloride.

Through partial etching of the carrier material, in the form of indicia, lines, dots or other designs, for example, it is possible deliberately to strengthen the anchoring of the adhesive at particular points. In this way, preset breakage points are formed, at which the adhesive undergoes transfer when the adhesive tape is demounted. The residues of adhesive, and the damaged adhesive tape itself, thus disclose removal of the adhesive tape, in the context, for example, of unauthorized opening of cartons.

Generally speaking, an improvement in the anchoring of the pressure-sensitive adhesive can be achieved by roughening the carrier material. One way of roughening and of chemically modifying the polymer structure proceeds via the wet-chemical etching of the carrier material. Besides etching, pretreatment can be carried out in other ways. For instance, for improving anchoring, the carrier materials can be pretreated physically and chemically. For physical treatment, the film is preferably treated by flame or corona or plasma. For chemical pretreatment, the carrier material is given a primer coat, with reactive primer coats being used in one particularly preferred version. Examples of suitable primer materials include reactive primers.

BRIEF DESCRIPTION OF THE DRAWING

For its use as a double-sided PSA tape for bonding printing plates, the PSA tape possesses, in one particularly preferred version of the invention, the product structure in FIG. 1.

The adhesive tape is used for bonding a printing plate which is composed of a PET film 2 and of a layer of a photopolymer 1.

The layers 3 to 9 form a double-sided adhesive plate-mounting tape which is compressible and elastic by virtue of its foamed carrier 8.

Beginning from the side by means of which the printing plate is bonded, the adhesive tape consists of the following individual sections:

- 3 pressure-sensitive adhesive for anchoring the printing plate
- 4 the roughened top surface of the PET film 5
- 5 film of polyethylene terephthalate (PET)
- 6 the roughened bottom surface of the PET film 5
- 7 pressure-sensitive adhesive for anchoring the foamed carrier 8 to the polyethylene terephthalate (PET) film 5
- 8 foamed carrier
- 9 pressure-sensitive adhesive for anchoring on the printing cylinder Specifically in the printing industry it is of significance if the adhesive tapes used here have a high flexibility; that is, if they are able to a certain extent to change their thickness on application of pressure and, when the load is removed, to take up their original form again.

For this reason, in a further advantageous embodiment of the double-sided adhesive tape, between the polyethylene terephthalate (PET) film and at least one adhesive there is a foamed carrier, in particular between the adhesive facing the printing cylinder or the sleeve and the polyethylene terephthalate (PET) film, insofar as the adhesive tape finds use in the printing industry.

It is advantageous, moreover, if the foamed carrier 8 is composed of polyolefin(s), polyurethane or PVC. In one particularly preferred embodiment, foamed polyethylenes and polypropylenes are used. It is further preferred if the surfaces of the foamed carrier have been physically pretreated, especially corona-pretreated.

With further preference, the film of polyethylene terephthalate (PET) has a thickness of from 5 µm to 500 µm, preferably 5 µm to 60 µm, with very particular preference 23 µm.

In addition to the product structure depicted in FIG. 1, the stabilizing film may also be composed of polyolefins, polyurethanes or PVC, and besides etching may also have been pretreated in another way. For instance, for improving anchoring, the stabilizing films can be pretreated physically and chemically. For physical treatment, the film is preferably treated by flame or corona or plasma. For chemical pretreatment, the film is given a primer coat, with reactive primer coats being used in one particularly preferred embodiment. Examples of suitable primer materials include reactive primers.

In one further preferred procedure, the stabilizing film of PET or another material is printed on one or both sides. This printing may take place under a pressure-sensitive adhesive for later application.

For the pressure-sensitive adhesives 7, in preferred versions acrylate PSAs are used.

In addition, the adhesive tape of the invention may be provided on one or both sides with a lining of paper or of a corresponding film, especially a double-sidedly siliconized liner, in order to ensure longer storage and comfortable handling in the course of service.

Owing to its special properties, the double-sided adhesive tape of the invention is outstandingly suitable for mounting printing plates, especially multilayer photopolymer printing plates, on printing cylinders or sleeves.

In one version a weakly adhering acrylate adhesive 3 is coated onto the side of the adhesive tape (see FIG. 1) which is mounted on the carrier layer of the printing plate. The adhesive in particular has a bond strength of 0.5 to 5.5 N/cm, preferably <2.5 N/cm.

The other adhesive coating is then formed by a more strongly adhering layer, preferably likewise based on acrylate. This coating is characterized in particular by a bond strength of 1 to 6 N/cm, preferably 4.5 N/cm. The bond strengths indicated are measured in accordance with AFERA 4001.

Owing to its special configuration, and particularly with the bond strengths attuned to the printing plate, the adhesive tape of the invention is outstandingly suitable for bonding the printing plates to the printing cylinders. On the one hand, it is possible to reposition the printing plates as often as desired before beginning printing; on the other hand, however, a secure bond of the plate during the printing process is ensured.

The printing plate can be removed from the PSA tape without any damage whatsoever. Peeling of the carrier layer of the plate or the formation of unwanted creases in the plate during removal does not occur. Moreover, no residues remain after the adhesive tape has been removed from the printing cylinder.

In the text below, the advantages of the adhesive tape of the invention are described in a number of experiments.

Experiments

The pressure-sensitive adhesive tapes of the invention are described below by means of experiments.

The following test methods were employed to evaluate the technical adhesive properties of the pressure-sensitive adhesives prepared.

Test Methods

A. Bond Strength

The peel strength (bond strength) was tested in accordance with PSTC-1. A PSA layer is applied at 20 g/m$^2$ to a PET film 25 µm thick.

A strip of this specimen, 2 cm wide, is adhered to a steel plate by rolling back and forth over the applied strip three times using a 2 kg roller. The plate is clamped in and the self-adhesive strip is peeled off via its free end on a tensile testing machine under a peel angle of 180° and with a speed of 300 mm/min.

B. Thermal Storage—Bond Strength

A PSA layer is applied at 20 g/m$^2$ to a PET film 25 µm thick.

A strip of this specimen, 2 cm wide, is stored in a drying cabinet at 60° C. for 3 months. It is then adhered to a steel plate by rolling back and forth over the applied strip three times using a 2 kg roller. The plate is clamped in and the self-adhesive strip is peeled off via its free end on a tensile testing machine under a peel angle of 180° and with a speed of 300 mm/min.

C. Bond Strength—Peel Increase

The peel strength (bond strength) was tested in accordance with PSTC-1. A PSA layer 100 µm thick is applied to a PET film 25 µm thick.

A strip of this specimen, 2 cm wide, is adhered to a steel plate by rolling back and forth over the applied strip three times using a 2 kg roller. After 72 h of adhesive bonding, the plate is clamped in and the self-adhesive strip is peeled off via its free end on a tensile testing machine under a peel angle of 180° and with a speed of 300 mm/min.

Production of Test Specimens

Example 1

A 2 L glass reactor conventional for free-radical polymerizations was charged with 8 g of acrylic acid, 272 g of 2-ethylhexyl acrylate, 120 g of isobornyl acrylate and 266 g of 1:1 acetone:special-boiling-point spirit 60/95. After nitrogen gas had been passed through the reactor for 45 minutes with stirring, the reactor was heated to 58° C. and 0.2 g of azoisobutyronitrile (AIBN, Vazo 64™, DuPont) in solution in 10 g of acetone was added. Subsequently the external heating bath was heated to 75° C. and the reaction was carried out constantly at this external temperature. After a reaction time of 1 h a further 0.2 g of AIBN in solution in 10 g of acetone was added. After a reaction time of 5 hours 0.8 g of bis(4-tert-butylcyclohexanyl) peroxydicarbonate (Perkadox 16™, Akzo Nobel) in solution in 10 g of acetone was added. After 6 hours the batch was diluted with 100 g of special-boiling-point spirit 60/95. After a reaction time of 7 hours 0.8 g of bis(4-tert-butyl-cyclohexanyl)peroxydicarbonate (Perkadox 16™, Akzo Nobel) in solution in 10 g of acetone was added. After 10 hours the batch was diluted with 150 g of special-boiling-point spirit 60/95. After a reaction time of 24 h the reaction was discontinued and the product cooled to room temperature. Subsequently the polyacrylate was blended with 0.6% by weight of aluminum(III) acetylacetonate (3% strength solution, acetone) and the blend was diluted to a solids content of 30% with special-boiling-point spirit 60/95 and then coated from solution onto a PET film. After drying at 120° C. for 30 minutes, the application rate was 50 g/m$^2$. The technical adhesive properties were analyzed by carrying out test methods A, B and C.

Example 2

A 2 L glass reactor conventional for free-radical polymerizations was charged with 8 g of acrylic acid, 312 g of 2-ethylhexyl acrylate, 80 g of isobornyl acrylate and 170 g of 1:1 acetone:special-boiling-point spirit 60/95. After nitrogen gas had been passed through the reactor for 45 minutes with stirring, the reactor was heated to 58° C. and 0.2 g of azoisobutyronitrile (AIBN, Vazo 64™, DuPont) in solution in 10 g of acetone was added. Subsequently the external heating bath was heated to 75° C. and the reaction was carried out constantly at this external temperature. After a reaction time of 1 h a further 0.2 g of AIBN in solution in 10 g of acetone was added. After a reaction time of 5 hours 0.8 g of bis(4-tert-butylcyclohexanyl)peroxydicarbonate (Perkadox 16™, Akzo Nobel) in solution in 10 g of acetone was added. After 6 hours the batch was diluted with 100 g of special-boiling-point spirit 60/95. After a reaction time of 7 hours 0.8 g of bis(4-tert-butyl-cyclohexanyl)peroxydicarbonate (Perkadox 16™, Akzo Nobel) in solution in 10 g of acetone was added. After 10 hours the batch was diluted with 150 g of special-boiling-point spirit 60/95. After a reaction time of 24 h the reaction was discontinued and the product cooled to room temperature. Subsequently the polyacrylate was blended with 0.6% by weight of aluminum(III) acetylacetonate (3% strength solution, acetone) and the blend was diluted to a solids content of 30% with special-boiling-point spirit 60/95 and then coated from solution onto a PET film. After drying at 120° C. for 30 minutes, the application rate was 50 g/m$^2$. The technical adhesive properties were analyzed by carrying out test methods A, B and C.

Example 3

A 2 L glass reactor conventional for free-radical polymerizations was charged with 8 g of acrylic acid, 312 g of 2-ethylhexyl acrylate, 80 g of stearyl acrylate and 266 g of 1:1 acetone:special-boiling-point spirit 60/95. After nitrogen gas had been passed through the reactor for 45 minutes with stirring, the reactor was heated to 58° C. and 0.2 g of azoisobutyronitrile (AIBN, Vazo 64™, DuPont) in solution in 10 g of acetone was added. Subsequently the external heating bath was heated to 75° C. and the reaction was carried out constantly at this external temperature. After a reaction time of 1 h a further 0.2 g of AIBN in solution in 10 g of acetone was added. After a reaction time of 5 hours 0.8 g of bis(4-tert-butylcyclohexanyl)peroxydicarbonate (Perkadox 16™, Akzo Nobel) in solution in 10 g of acetone was added. After 6 hours the batch was diluted with 100 g of special-boiling-point spirit 60/95. After a reaction time of 7 hours 0.8 g of bis(4-tert-butyl-cyclohexanyl)peroxydicarbonate (Perkadox 16™, Akzo Nobel) in solution in 10 g of acetone was added. After 10 hours the batch was diluted with 150 g of special-boiling-point spirit 60/95. After a reaction time of 24 h the reaction was discontinued and the product cooled to room temperature. Subsequently the polyacrylate was blended with 0.6% by weight of aluminum(III) acetylacetonate (3% strength solution, acetone) and the blend was diluted to a solids content of 30% with special-boiling-point spirit 60/95 and then coated from solution onto a PET film. After drying at 120° C. for 30 minutes, the application rate was 50 g/m$^2$. The technical adhesive properties were analyzed by carrying out test methods A, B and C.

Example 4

A 2 L glass reactor conventional for free-radical polymerizations was charged with 8 g of acrylic acid, 352 g of 2-ethylhexyl acrylate, 40 g of isobornyl acrylate and 170 g of 1:1 acetone:special-boiling-point spirit 60/95. After nitrogen gas had been passed through the reactor for 45 minutes with stirring, the reactor was heated to 58° C. and 0.2 g of azoisobutyronitrile (AIBN, Vazo 64™, DuPont) in solution in 10 g of acetone was added. Subsequently the external heating bath was heated to 75° C. and the reaction was carried out constantly at this external temperature. After a reaction time of 1 h a further 0.2 g of AIBN in solution in 10 g of acetone was added. After a reaction time of 5 hours 0.8 g of bis(4-tert-butylcyclohexanyl)peroxydicarbonate (Perkadox 16™, Akzo Nobel) in solution in 10 g of acetone was added. After 6 hours the batch was diluted with 100 g of special-boiling-point spirit 60/95. After a reaction time of 7 hours 0.8 g of bis(4-tert-butyl-cyclohexanyl)peroxydicarbonate (Perkadox 16™, Akzo Nobel) in solution in 10 g of acetone was added. After 10 hours the batch was diluted with 150 g of special-boiling-point spirit 60/95. After a reaction time of 24 h the reaction was discontinued and the product cooled to room temperature. Subsequently the polyacrylate was blended with 0.6% by weight of aluminum(III) acetylacetonate (3% strength solution, acetone) and the blend was diluted to a solids content of 30% with special-boiling-point spirit 60/95 and then coated from solution onto a PET film. After drying at 120° C. for 30 minutes, the application rate was 50 g/m$^2$. The technical adhesive properties were analyzed by carrying out test methods A, B and C.

Reference R1

A 2 L glass reactor conventional for free-radical polymerizations was charged with 8 g of acrylic acid, 372 g of 2-ethylhexyl acrylate, 20 g of isobornyl acrylate and 170 g of 1:1 acetone:special-boiling-point spirit 60/95. After nitrogen gas had been passed through the reactor for 45 minutes with stirring, the reactor was heated to 58° C. and 0.2 g of azoisobutyronitrile (AIBN, Vazo 64™, DuPont) in solution in 10 g of acetone was added. Subsequently the external heating bath was heated to 75° C. and the reaction was carried out constantly at this external temperature. After a reaction time of 1 h a further 0.2 g of AIBN in solution in 10 g of acetone was added. After a reaction time of 5 hours 0.8 g of bis(4-tert-butylcyclohexanyl)peroxydicarbonate (Perkadox 16™, Akzo Nobel) in solution in 10 g of acetone was added. After 6 hours the batch was diluted with 100 g of special-boiling-point spirit 60/95. After a reaction time of 7 hours 0.8 g of bis(4-tert-butyl-cyclohexanyl)peroxydicarbonate (Perkadox 16™, Akzo Nobel) in solution in 10 g of acetone was added. After 10 hours the batch was diluted with 150 g of special-boiling-point spirit 60/95. After a reaction time of 24 h the reaction was discontinued and the product cooled to room temperature. Subsequently the polyacrylate was blended with 0.6% by weight of aluminum(III) acetylacetonate (3% strength solution, acetone) and the blend was diluted to a solids content of 30% with special-boiling-point spirit 60/95 and then coated from solution onto a PET film. After drying at 120° C. for 30 minutes, the application rate was 50 g/m². The technical adhesive properties were analyzed by carrying out test methods A, B and C.

Reference R2

A 2 L glass reactor conventional for free-radical polymerizations was charged with 8 g of acrylic acid, 192 g of 2-ethylhexyl acrylate, 200 g of isobornyl acrylate and 170 g of 1:1 acetone:special-boiling-point spirit 60/95. After nitrogen gas had been passed through the reactor for 45 minutes with stirring, the reactor was heated to 58° C. and 0.2 g of azoisobutyronitrile (AIBN, Vazo 64™, DuPont) in solution in 10 g of acetone was added. Subsequently the external heating bath was heated to 75° C. and the reaction was carried out constantly at this external temperature. After a reaction time of 1 h a further 0.2 g of AIBN in solution in 10 g of acetone was added. After a reaction time of 5 hours 0.8 g of bis(4-tert-butylcyclohexanyl)peroxydicarbonate (Perkadox 16™, Akzo Nobel) in solution in 10 g of acetone was added. After 6 hours the batch was diluted with 100 g of special-boiling-point spirit 60/95. After a reaction time of 7 hours 0.8 g of bis(4-tert-butyl-cyclohexanyl)peroxydicarbonate (Perkadox 16™, Akzo Nobel) in solution in 10 g of acetone was added. After 10 hours the batch was diluted with 150 g of special-boiling-point spirit 60/95. After a reaction time of 24 h the reaction was discontinued and the product cooled to room temperature. Subsequently the polyacrylate was blended with 0.6% by weight of aluminum(III) acetylacetonate (3% strength solution, acetone) and the blend was diluted to a solids content of 30% with special-boiling-point spirit 60/95 and then coated from solution onto a PET film. After drying at 120° C. for 30 minutes, the application rate was 50 g/m². The technical adhesive properties were analyzed by carrying out test methods A, B and C.

Reference R3

A 2 L glass reactor conventional for free-radical polymerizations was charged with 8 g of acrylic acid, 352 g of 2-ethylhexyl acrylate, 40 g of isobornyl acrylate and 170 g of 1:1 acetone:special-boiling-point spirit 60/95. After nitrogen gas had been passed through the reactor for 45 minutes with stirring, the reactor was heated to 58° C. and 0.2 g of azoisobutyronitrile (AIBN, Vazo 64™, DuPont) in solution in 10 g of acetone was added. Subsequently the external heating bath was heated to 75° C. and the reaction was carried out constantly at this external temperature. After a reaction time of 1 h a further 0.2 g of AIBN in solution in 10 g of acetone was added. After 6 hours the batch was diluted with 100 g of special-boiling-point spirit 60/95. After 10 hours the batch was diluted with 150 g of special-boiling-point spirit 60/95. After a reaction time of 24 h the reaction was discontinued and the product cooled to room temperature. Subsequently the polyacrylate was blended with 0.6% by weight of aluminum(III) acetylacetonate (3% strength solution, acetone) and the blend was diluted to a solids content of 30% with special-boiling-point spirit 60/95 and then coated from solution onto a PET film.

Bond Strength Determination of Examples 1-4 and Reference Examples R1 and R2

TABLE 1

| Example | BS to steel instantaneous[a] [N/cm] Test A | BS to steel after 72 h[b] [N/cm] Test C | BS after 60° C.[c] [N/cm] Test B |
|---|---|---|---|
| 1 | 5.0 | 5.2 | 5.5 |
| 2 | 3.8 | 4.2 | 4.4 |
| 3 | 2.4 | 2.7 | 2.9 |
| 4 | 3.0 | 3.4 | 3.7 |
| R1 | 2.7 | 3.6 | 5.4 |
| R2 | 2.2 | 2.6 | 6.0 |

[a]BS = bond strength to steel at 23° C. and 50% atmospheric humidity, measured after bonding.
[b]BS = bond strength to steel at 23° C. and 50% atmospheric humidity after 72 hours of bonding.
[c]BS = bond strength to steel at 23° C. and 50% atmospheric humidity after bonding; the PSA tapes were stored at 60° C. for 3 months beforehand.
50 g/m² application rate to PET film 25 µm thick.

From the figures from table 1 it can be inferred that the inventive examples, even under very extreme storage conditions, possess only a very low peel increase. In contrast, the examples R1 and R2 already exhibit a much greater peel increase, since in the case of R1 the adhesive is already very soft and is therefore able to flow out very well over a prolonged period of time. Reference example R2, by contrast, is very hard and therefore exhibits—especially at high temperatures—an improved flow-out and hence a high peel increase in test C. For use for the bonding of printing plates it is preferred to use pressure-sensitive adhesives having a low peel increase preferably, in order that the PSA tape can be removed again easily after the printing process. The bonds may extend from several days through to several months, so that test C in particular is very informative as regards the suitability of a pressure-sensitive adhesive for bonding printing plates. Here, the inventive adhesives produced according to the method show themselves to be very advantageous as compared, for example, with the systems containing only a very low fraction (R1) or a very high fraction (R2) of isobornyl acrylate.

Production of the Double-Sided PSA Tape Assembly:

A PET film 25 µm thick and etched on both sides with trichloroacetic acid was coated with examples 1, 2, 3, 4, R1 or R2. Following crosslinking and drying, the application rate was 20 g/m². For this purpose the film was coated directly from solution with the examples and dried at 100° C. for 30 minutes. The specimens thus coated were lined with a double-sidedly siliconized release paper. Subsequently, a commercially customary acrylate PSA was laminated via a transfer carrier onto the uncoated side of the existing assembly, with an application rate of 20 g/m².

In the following step, a EVA foam with a thickness of 500 µm and a density of 270 kg/m³ was laminated on. Then, again via a transfer carrier, a commercially customary acrylate PSA is laminated onto this foam carrier, onto the uncoated side of the existing assembly, at an application rate of 50 g/m².

Adhesive Bonding of Printing Plates and Use:

The double-sided PSA tapes described above with the adhesive side lying open (see FIG. 1, layer 9) were adhered to a steel cylinder having a diameter of 110 mm. On top of this, a printing plate from DuPont Cyrel® HOS with a thickness of 1.7 mm, with layer 2 from the figure was bonded to the PSA (layer 3 in FIG. 1). This steel cylinder with printing plate was subsequently inserted into a printing machine where it was used for printing for 16 hours with a print setting of 150 μm.

For all of the examples, the printing plate was very easy to remove by hand from the double-sided adhesive tape, without any residue.

After 7-day storage at 23° C. and 50% atmospheric humidity, the edge lifting of the printing plate from the double-sided PSA tape was ascertained. The values are reported in mm, are averaged from three measurements, and are summarized in table 2.

TABLE 2

| Example | Edge lifting of the printing plate in mm |
|---------|------------------------------------------|
| 1       | 5                                        |
| 2       | 20                                       |
| 3       | 25                                       |
| 4       | 18                                       |
| R1      | 55                                       |
| R2      | 60                                       |
| R3      | 35                                       |

A PSA tape suitable for printing-plate bonding ought to exhibit edge lifting of less than 30 mm. The boundary is a function of the fact that, at higher values, the printing process is severely impaired.

Examples 1 to 4 meet this requirement on the one hand as a result of the production method, which allows the formation of graft copolymers. Example R3, without a graft initiator, demonstrates that the edge lifting deteriorates markedly. On the other hand, examples 1 to 4 in combination with the inventive method show that edge lifting can be reduced to the degree necessary.

The invention claimed is:

1. A method for mounting printing plates to printing cylinders or sleeves, which comprises mounting said printing plates to said cylinders or sleeves with a pressure-sensitive adhesive tape having a flat carrier material which is coated on both sides with a pressure-sensitive adhesive, the side of the flat carrier material upon which said printing plate is mounted being coated with a weakly adhering pressure-sensitive adhesive having a bond strength of <2.5 N/cm and comprising polymers formed from a monomer mixture of at least the following components:

i.a) 49.5%-89.5% by weight (based on the monomer mixture) of acrylic esters and/or methacrylic esters and/or of free acids corresponding to said acrylic esters and/or methacrylic esters, with the following formula:

$CH_2=C(R_1)(COOR_2)$, where $R_1=H$ or $CH_3$ and $R_2$ is an alkyl radical having 1 to 10 carbon atoms or H and a homopolymer thereof possesses a static glass transition temperature of <−30° C.;

i.b) 10% to 40% by weight (based on the monomer mixture) of acrylic esters and/or methacrylic esters with the following formula:

$CH_2=C(R_3)(COOR_4)$, where $R_3=H$ or $CH_3$ and $R_4$ is a cyclic alkyl radical having at least 8 carbon atoms or a linear alkyl radical having at least 12 carbon atoms and a homopolymer thereof possesses a static glass transition temperature of at least 30° C.;

i.c) 0.5%-10% by weight (based on the monomer mixture) of acrylic esters and/or methacrylic esters with the following formula:

$CH_2=C(R_3)(COOR_5)$, where $R_3=H$ or $CH_3$ and $R_5=H$ or an aliphatic radical containing a functional group X, X comprising COOH, OH, —NH, $NH_2$, SH, $SO_3H$, and a homopolymer thereof possesses a static glass transition temperature of at least 30° C., said polymers being crosslinked with a metal chelate crosslinker, and the side of the flat carrier material that is mounted to said cylinders or sleeves being coated with a more strongly adhering pressure-sensitive adhesive.

2. The method of claim 1, wherein said polymers of said weakly adhering pressure-sensitive adhesive have a molar mass $M_n$ of between about 10 000 and about 600 000 g/mol.

3. The method of claim 1, wherein said polymers are present in a branched state as graft polymers.

4. The method of claim 1, wherein said weakly adhering pressure-sensitive adhesive comprises tackifier resins.

5. The method of claim 4, wherein the tackifier resins are present in an amount of up to 40% by weight of said polymers.

6. The method of claim 1, wherein said weakly adhering pressure-sensitive adhesive comprises additives selected from the group consisting of plasticizers, fillers, nucleators, expandants, compounding agents, aging inhibitors, and light stabilizers.

7. The method of claim 1, wherein the carrier material is a film of polyester, PET, PE, PP, BOPP or PVC.

8. The method of claim 7, wherein the film is a film made of PET and has a thickness of 5 to 500 μm.

9. The method of claim 1, wherein the carrier material is a polymer foam of PU, PVC or polyolefin.

10. The method of claim 1, wherein the carrier material is a combination of a film and at least one foam carrier, the film being connected by an adhesive to the at least one foam carrier.

11. The method of claim 1, wherein the carrier material is pretreated by flame, corona and/or plasma, and/or chemically, and/or by provision with primer.

* * * * *